(12) United States Patent
Coldrey et al.

(10) Patent No.: US 8,526,553 B2
(45) Date of Patent: Sep. 3, 2013

(54) WIRELESS COMMUNICATION NODE CONNECTIONS

(75) Inventors: Mikael Coldrey, Landvetter (SE); Fredrik Athley, Kullavik (SE); Sven Oscar Petersson, Savedalen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 85 days.

(21) Appl. No.: 13/376,420

(22) PCT Filed: Jun. 8, 2009

(86) PCT No.: PCT/EP2009/057055
§ 371 (c)(1), (2), (4) Date: Dec. 6, 2011

(87) PCT Pub. No.: WO2010/142323
PCT Pub. Date: Dec. 16, 2010

(65) Prior Publication Data
US 2012/0087450 A1 Apr. 12, 2012

(51) Int. Cl.
*H03D 1/04* (2006.01)

(52) U.S. Cl.
USPC ........... 375/346; 343/700; 343/770; 343/725; 343/798; 343/893

(58) Field of Classification Search
USPC .............. 375/346, 260, 267; 343/700, 850, 343/770, 725, 702
See application file for complete search history.

(56) References Cited

U.S. PATENT DOCUMENTS

| | | | | |
|---|---|---|---|---|
| 5,548,820 A * | 8/1996 | Victorin | ..................... | 455/67.14 |
| 6,509,883 B1 * | 1/2003 | Foti et al. | ..................... | 343/850 |
| 6,608,591 B2 * | 8/2003 | Wastberg | ..................... | 342/373 |
| 6,640,111 B1 * | 10/2003 | Shapira | ..................... | 455/562.1 |
| 7,069,053 B2 * | 6/2006 | Johannisson et al. | ...... | 455/562.1 |
| 7,391,386 B2 * | 6/2008 | Sawaya et al. | ................ | 343/833 |
| 8,036,286 B2 * | 10/2011 | Lee et al. | ..................... | 375/260 |
| 8,185,162 B2 * | 5/2012 | Haskell et al. | ............. | 455/562.1 |
| 8,248,977 B2 * | 8/2012 | Harverson | ................ | 370/310.2 |
| 2002/0080073 A1 * | 6/2002 | Wastberg | ............... | 343/700 MS |
| 2003/0073463 A1 * | 4/2003 | Shapira | ......................... | 455/562 |
| 2003/0137464 A1 * | 7/2003 | Foti et al. | ..................... | 343/770 |

(Continued)

FOREIGN PATENT DOCUMENTS

| DE | 19644965 A1 | 4/1998 |
|---|---|---|
| WO | 2008073010 A1 | 6/2008 |

*Primary Examiner* — Daniel Washburn
*Assistant Examiner* — Berhanu Tadese
(74) *Attorney, Agent, or Firm* — Rothwell, Figg, Ernst & Manbeck, P.C.

(57) ABSTRACT

The present invention relates to a wireless communication node (20A) adapted to via feeder ports be connected to antenna ports. It comprises signal handling and estimating means (21A) adapted to collect signals from a mobile station and to generate a plurality of channel estimates, connection combination information holding means (22A) adapted to hold information about all possible feeder port-antenna port connections, processing means (24A) comprising channel modelling means (23A) adapted to provide a channel model for the received signals. If further comprises channel model fitting means (25A) adapted to compare the channel model with the channel estimates for a plurality of permutations obtained by the connection combination information and order identifying means (26A) adapted to identify the feeder port connection order corresponding to the permutation order giving the best fit between channel model and channel estimates, hence allowing identification of the order in which the feeder ports actually are connected to the antenna ports.

24 Claims, 5 Drawing Sheets

(56) References Cited

U.S. PATENT DOCUMENTS

| | | | |
|---|---|---|---|
| 2003/0139198 A1* | 7/2003 | Johannisson et al. | 455/525 |
| 2004/0095278 A1* | 5/2004 | Kanemoto et al. | 343/700 MS |
| 2005/0017912 A1* | 1/2005 | Azoulay et al. | 343/725 |
| 2005/0030232 A1* | 2/2005 | Monebhurrun et al. | 343/702 |
| 2005/0101352 A1* | 5/2005 | Logothetis et al. | 455/562.1 |
| 2006/0197538 A1* | 9/2006 | Leinonen et al. | 324/533 |
| 2007/0035463 A1* | 2/2007 | Hirabayashi | 343/824 |
| 2008/0204318 A1* | 8/2008 | Thomas et al. | 342/361 |
| 2008/0246663 A1* | 10/2008 | Fox | 342/373 |
| 2010/0008455 A1* | 1/2010 | Willgert | 375/346 |
| 2010/0013710 A1* | 1/2010 | Lindgren et al. | 342/373 |
| 2010/0046386 A1* | 2/2010 | Kwon et al. | 370/252 |
| 2010/0046650 A1* | 2/2010 | Jongren et al. | 375/260 |
| 2010/0066635 A1* | 3/2010 | Lindgren et al. | 343/893 |
| 2010/0067605 A1* | 3/2010 | Jongren | 375/267 |
| 2010/0120441 A1* | 5/2010 | Wan et al. | 455/446 |
| 2010/0171675 A1* | 7/2010 | Borja et al. | 343/798 |
| 2011/0092171 A1* | 4/2011 | Delforce | 455/90.2 |
| 2012/0007789 A1* | 1/2012 | Petersson et al. | 343/876 |
| 2012/0064838 A1* | 3/2012 | Miao et al. | 455/73 |
| 2012/0069780 A1* | 3/2012 | Athley et al. | 370/280 |
| 2012/0083317 A1* | 4/2012 | Athley et al. | 455/562.1 |
| 2012/0088537 A1* | 4/2012 | Petersson et al. | 455/522 |

* cited by examiner

WIRELESS COMMUNICATION NODE CONNECTIONS

CROSS REFERENCE TO RELATED APPLICATION(S)

This application is a 35 U.S.C. §371 National Phase Entry Application from PCT/EP2009/057055, filed Jun. 8, 2009, designating the United States, the disclosure of which is incorporated by reference herein in its entirety.

TECHNICAL FIELD

The present invention relates to a wireless communication node being adapted to be connected to or comprising an antenna part with a plurality of antenna elements with respective antenna ports to which feeder port of the wireless communication node are connected. The antenna ports are associated with unique antenna port identifications and the feeder ports are associated with respective unique feeder port identifications. The invention also relates to a method for in such a node determining which antenna ports actually are connected to which feeder ports.

BACKGROUND

For antenna arrangments comprising a plurality antenna elements, for example array antenna systems, it is in many cases important to know which antenna ports actually are connected to which feeder ports, i.e. to which radio chains. This means not only the way they should have been connected, but the way they actually have been connected. It is of most importance that they are connected in a specific desired manner, which means that there is a need to exactly know which radio chain (feeder port) that is connected to which antenna port, or the connection order, presuming the antenna ports are arranged in a given order. An example when this is important is when there is an antenna part for which all antenna elements, or subgroups of antenna elements, are located in such a manner that the radio channel becomes significantly correlated. In one specific example the antenna part comprises a uniform linear array (ULA) intended to be used for sector covering transmission, which means that the beam pattern simultaneously shall cover the entire sector. Such a beam pattern can be generated by the application of a weight vector with phase and/or amplitude taper. Then it is exceedingly important that the individual weights are applied to the intended or the appropriate antenna elements since otherwise the beam pattern will be distorted.

For generating a beam pattern with a desired shape by means of applying a weight vector to an antenna arrangement, or an array antenna, i.e. beamforming, coherency is considered significant in order to enable that the desired beam shape be obtained. This particularly means that the phase and the amplitude in all radio branches must be known with a sufficient accuracy. If the feeder ports are incorrectly connected to the antenna ports, i.e. if radio paths are incorrectly connected to the antenna ports, the beam pattern will be distorted even if phase and amplitude relations are correct or as desired. This means that coherency can be seen as involving, in addition to phase, amplitude and time relations, also spatial locations.

In known arrangements mainly manual methods have been employed to ensure that cables are connected in the appropriate manner, i.e. that the feeder ports are connected to the antenna ports the way they should have been. A simple manual method consists in marking the cables at both ends. However, in practice cables are often connected incorrectly even if the cables have been marked. One reason for this is that there may be many feeder cables. Another reason is that configuration as well as reconfiguration or reconnection of cables often takes place quite far away from the antenna. A physical verification of the cabling is also difficult and time consuming considering that the antennas often are located in high masts. It is extremely difficult to determine if a connection has been established correctly and it is also complicated to handle connection errors since it is difficult to identify how the cables actually have been connected or what the errors are.

SUMMARY

It is a general object of the present invention to provide a wireless communication node through which it is possible to identify actual feeder cable connection order. A particular object of the invention is to provide a communication node through which it is possible to identify actual or current feeder cable connection order, which is robust, i.e. insensitive to noise. It is a further particular object of the invention to enable identification of actual cable connection order for single polarized antenna arrangements as well as for dual polarized antenna arrangements, in some particular embodiments also including determination of whether the antenna arrangement comprises antenna means with single or dual polarized antenna means. It is a further object to enable identification of which antenna elements that are associated with the one or the other polarization. It is also a general object of the invention to provide a method through which actual, current connection status or connection order can be determined.

Therefore a wireless communication node as initially referred to is provided which comprises signal handling and estimating means adapted to collect signals from a mobile station and to generate a plurality of channel estimates for signals received over antenna ports of a same polarization, also called a first polarization. It also comprises connection combination information handling means adapted to hold or provide information about all possible connections between feeder ports and antenna ports. Further it comprises processing means comprising or communicating with channel modelling means adapted to provide a channel model for the signals received by the co-polarized antenna elements, i.e. over the antenna ports of the first polarization.

The processing means also comprises channel model fitting means adapted to compare the channel model with the channel estimates for a plurality of permutations of the channel model or of the channel estimates. The permutations are given by the connection combination information. Order identifying means are adapted to identify the feeder port connection order which corresponds to the permutation order giving the best fit between the channel model and channel estimates as the current feeder port connection order.

The wireless communication node is thus adapted to, for co-polarized antenna elements, for a plurality of permutations fit channel model and channel estimates. In some implementations the channel model comprises a vector, which is permuted, and the permutations thereof are fitted to channel estimates. Preferably the channel model permutations are normalized as well as the channel estimates. In alternative embodiments the channel model vector, particularly normalized, is fitted to permuted and normalized channel estimates. This means that according to the inventive concept, either the estimates are permuted or the channel model is permuted.

According to the invention a corresponding method is also provided which is based on a concept which comprises using measurements of uplink signals to identify the order in which cables have been connected. The method comprises the steps of, for feeder ports associated with a same polarization, performing a channel estimation using a known reference signal to obtain channel estimates. The channel estimation can be carried out in any appropriate manner. Possible combinations of antenna port and feeder port connections are also found, which may comprise all possible permutations. By means of a modeling function a channel model is provided or generated. The provisioning of channel models can be carried out in any appropriate manner. For a plurality of permutations as given by the connection combination information the channel model is fitted to the channel estimates. The method comprises the step of identifying the feeder port connection order corresponding to the permutation giving the best fit between the channel model and the channel estimates as current feeder port connection order. For an antenna part comprising antenna elements of different polarizations it has first to be established which ports correspond to which polarization. The method as described above is performed separately, consecutively or simultaneously, for the ports associated with the respective polarizations. In particular embodiments it is also possible to actually identify whether an antenna part comprises antenna elements of one polarization only or if it comprises antenna elements of different polarizations.

It is an advantage of the invention that a simple and substantially automatic way of identifying which feeder ports have been connected to which antenna ports is provided. It is particularly an advantage of the invention that a reliable wireless communication node and a method are provided for determining in which order feeder ports have been connected to antenna ports. Particularly it can be carried out without requiring any marking of the cables or substantially without any manual interaction at all. A particular advantage is that it is possible to identify feeder port connection order for single polarized as well as for dual polarized antennas. It is also a particular advantage that a noise insensitive arrangement is obtained, enabling a fast and reliable determination of connection state. It is also an advantage that it becomes possible to automatically compensate for detected erroneous connection orders.

BRIEF DESCRIPTION OF THE DRAWINGS

The invention will in the following be more thoroughly described, in a non-limiting manner, and with reference to the accompanying drawings, in which.

DETAILED DESCRIPTION

Figure 1:
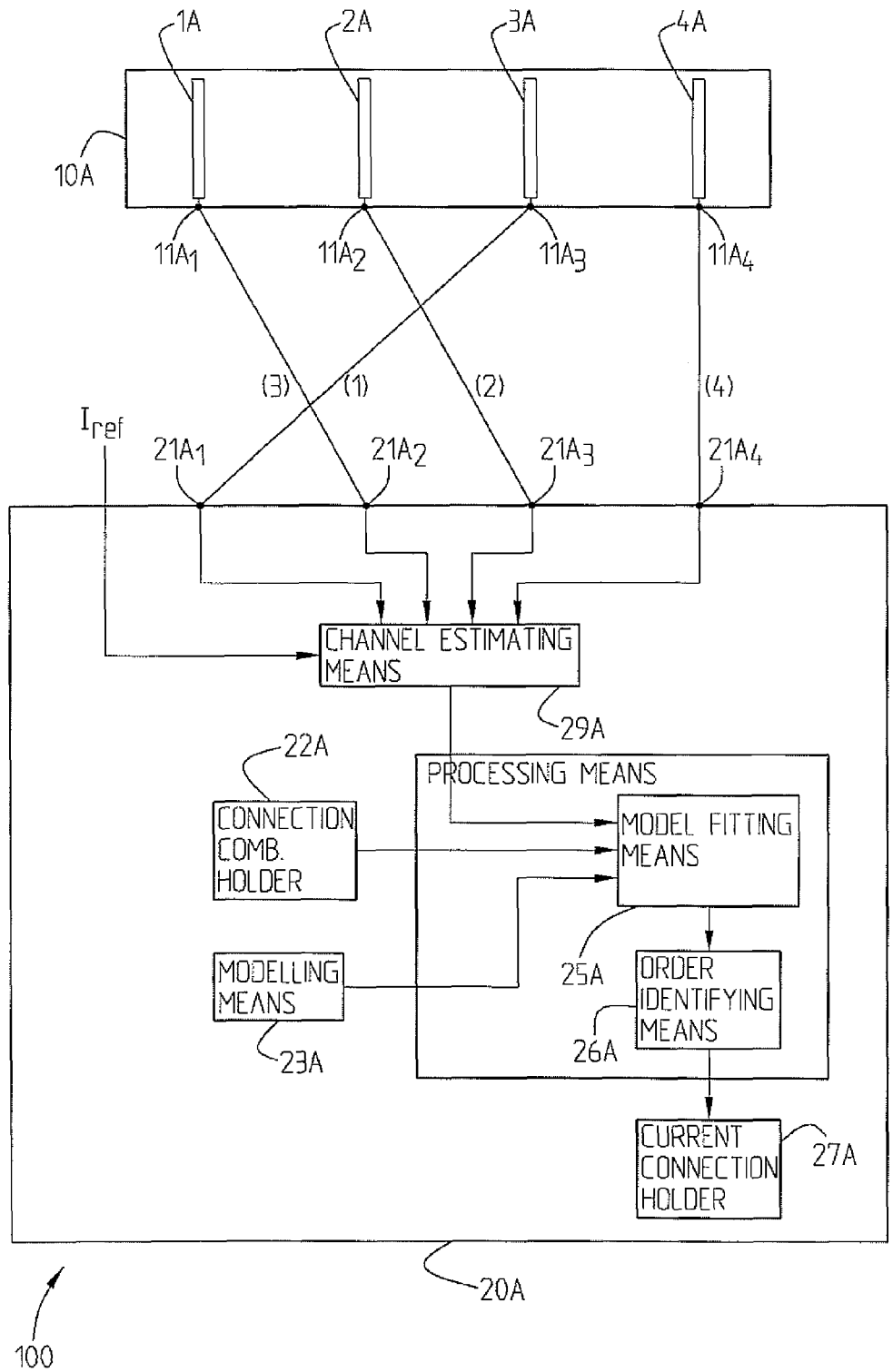
FIG. 1 is a block diagram of a first embodiment of a wireless communication node connected to an antenna arrangement with single polarized antennas.

FIG. 1 is a block diagram showing a first examplary embodiment of a wireless communication node $20A$ according to the present invention. It is adapted to be connected to or comprises an antenna part $10A$ with a plurality of antenna elements $1A, 2A, 3A, 4A$ which here are of the same polarization. It should be clear that the invention is not limited to wireless communication nodes adapted to be connected to or comprising an antenna part with four antenna elements. FIG. 1 merely relates to a particular example. In practise it could be somewhat fewer antenna elements as well as considerably more antenna elements, particularly since the problems intended to be solved by the present invention tend to become more complicated and serious the more antenna elements on the antenna part.

Each antenna element is connected to an antenna port $11A_1, 11A_2, 11A_3, 11A_4$. The antenna elements $1A, 2A, 3A, 4A$ are connected by means of feeder cables to feeder ports $21A_1, 21A_2, 21A_3, 21A_4$. In this case the current connection combination is as follows: feeder port $21A_1$ has been connected to antenna port $11A_3$, feeder port $21A_2$ has been connected to antenna port $11A_1$, feeder port $21A_3$ has been connected to antenna port $11A_2$ and feeder port $21A_4$ has been connected to antenna port $11A_4$ giving as current connection order $\{3, 1, 2, 4\}$. It is supposed that with a correct connection order feeder port $21A_1$ should have been connected to antenna port $11A_1$, feeder port $21A_2$ to antenna port $11A_2$ etc. but how they actually have been connected is not known and this is what is to be established according to the present invention.

The inventive concept is based on using measurements of uplink signals to identify in which order the cables actually have been connected. In this embodiment all antenna elements are of a first polarization. A model based approach is used to determine the connection order of the feeder ports. The wireless communication node in this embodiment is a base station arrangement $20A$. It comprises channel estimating means $21A$ adapted to, using a reference signal $I_{ref}$, provide a plurality of channel estimates. A parameterized data model is generated in modeling means $23A$ and the model is fitted to the measurement data, i.e. the estimates for a plurality of permutations. The modeling means can be implemented as a separate processing means or as a processing means included in or forming part of the processing means handling the fitting. Connection combination holding means $22A$ are provided for establishing, i.e. generating the number of possible combinations between feeder ports and antenna ports, or for collecting such information. The plurality of permutations may be all possible permutations $N!$ or half the number of possible connection combinations $N!/2$ since there will be two permutation orders yielding the same result and therefore ambiguous permutations can be excluded as will be more thoroughly discussed below.

In model fitting means $25A$, for the determined number of permutations, the channel model (particularly a channel model vector) is fitted to a plurality of channel estimates. In the model fitting means $25A$ or in separate order identifying means $26A$ the current connection order is identified as the connection order of the permutation for which the error is minimized in the fit described above. The current connection order may be stored in current connection holder $27A$ (e.g. a cache) or delivered to some other means used in the processing means or elsewhere in any desired manner.

In the embodiment shown in FIG. 1 it is supposed that there are N co-polarized antenna elements (in this particular simplified block diagram there are only four antenna ports, thus corresponding to N) which have been permuted by some unknown permutation matrix P. The permuted model of a discrete multipath channel is given by:

$$y(t) = P\left(\sum_n h_n(t)s(t-\tau_n(t)) + n(t)\right),$$

wherein s(t) is the input information bearing signal, $h_n(t)$ is the fading channel for the n-th path, wherein each path corresponds to a certain angle since the signals are received over different angles, and $\tau_n(t)$ is the corresponding propagation delay. It is here supposed that the individual channels (or taps) and their corresponding time delays have been resolved by using a pilot or reference signaling, for example as it is done in a wideband code division multiple access (WCDMA) system.

It is assumed that the channel vector realizations have been estimated in the channel estimating means 21A, and therefore are known. It is furthermore assumed that the channel, or the taps, can be modeled according to:

$$h_n(t) = \gamma_n(t)a(\theta_n) + \tilde{n}(t),$$

wherein $\gamma_n(t)$ is a complex scalar that for example may correspond to a complex Gaussian random process if the channel is described by a Rayleigh fading process, $$a(\theta_n) = [1, e^{-j2\pi d/\lambda \sin(\theta_n)}, \ldots, e^{-j2\pi(M-1)d/\lambda \sin(\theta_n)}]$$

is the corresponding non-permuted array response vector with respect to the direction of arrival (DOA) $\theta_n$, i.e. the true response if the ports had been connected correctly, and vector $\tilde{n}(t)$ is a noise vector accounting for model and channel estimation errors.

The direction of arrival, DOA, typically varies on a much slower time basis than the random fading channel. It can therefore be assumed that the DOA is essentially fixed during a period of time, i.e. for a number of channel snapshots, $t=1, \ldots, T$. It is thus assumed that access is given to a number T of more or less uncorrelated samples of a permuted version of the signal model $h_n(t)$, see above, for which the DOA is fixed. The object is to, for a given set of permuted channel estimates, identify the permutation matrix P. This can be achieved by resolving a Weighted Least Squares (WLS) problem. The solution to this WLS problem is given by:

$$\{\hat{P}, \hat{\theta}_n\} = \arg\min_{P(i), i=1,\ldots,N!}\left(\min_{\theta_n}\sum_{t=1}^T w_n(t)\|\bar{h}_n(t) - \bar{a}(\theta_n)\|_2^2\right),$$

wherein P(i) is the permutation matrix corresponding to the port order p(i), $w_n(t)$ is a weighting function, $h_n(t)$ is a normalized channel response estimate vector and $a(\theta_n)$ is a normalized version of the permuted steering vector $P(i)a(\theta_n)$. The normalization is given by dividing the vectors by their corresponding first element, which then means that the first element of the normalized vectors respectively will equal unity. The inventive concept is not restricted to performing a normalization, particularly not a normalization carried out in this manner, but a normalization as such is advantageous since each channel vector realization corresponds to a certain scaled steering vector $a(\theta_n)$, where the DOA $\theta_n$ is fixed for a number of T channel snapshots.

The random complex scaling, which is constituted of an amplitude and a phase, is for one particular snapshot the same for all antenna ports. The normalization is advantageous and it is introduced in order to remove such random amplitude and phase.

In some embodiments the weighting function $w_n(t)$ is set to unity for all snapshots which means that the problem is reduced to a conventional Least Squares problem. Alternatively it can be set such that it emphasizes channel snapshots being more reliable, i.e. snapshots corresponding to a high Signal to Noise Ratio (SNR) are given a higher weight. The weighting function can thus be set to equal the squared norm of the non-normalized channel vector realizations, i.e. corresponding to a predetermined weighting function $w_n(t) = \|h_n(t)\|_2^2$, which emphasizes strong channel realizations.

In WLS approaches it is common to also include the inverse noise covariance matrix as a weighting matrix, but in this embodiment it is assumed that it is proportional to the identity matrix and invariant with respect to time t, since no detailed information is provided about it and it is therefore omitted. However, embodiments also including the covariance matrix are covered by the inventive concept.

Through application of weighting as discussed above the identification performance is improved at low SNR whereas it has little or no effect at high SNR.

The solution to the WLS problem disclosed above is found by solving an N! long sequence of one-dimensional DOA estimation problems followed by choosing the permutation that gives the smallest least square error. The solution outlined above has been given for the n-th path or tap, but it can of course be extended to include all of the resolved multipath components in order to improve the identification performance.

If a WLS approach is used, this will also give larger weights to strong taps and smaller weights to less reliable weak taps. If not all taps are used, in preferred embodiments only the strongest ones are used and the weighting function is only applied to such taps. Application of weights can be varied in a number of different ways. It should also be noted that it is not necessary to use any weighting at all or alternatively any appropriate weighting procedure can be implemented.

It should also be noted that the one-dimensional cost functions are multimodal with respect to $\theta_n$, and it is therefore important to try to identify the global optimum. The calculations may of course be done for all permutations, but it has been realized that there are two permutations which give minimum Least Square error. This means that the final solution is ambiguous. It is ambiguous in the sence that, if for example the permutation order p(1)={1 3 2 4} minimizes the Least Square error, then the reversed permutation order p(2)={4 2 3 1} will also minimize the Least Square error. This will however not affect the unpermuted usage of the antenna array since the main reason for identifying the perturbation is to be able to design a sector covering beam at broad side. In fact, in advantageous implementations this makes it possible to reduce the number of permutations searched over to N!/2 since all ambiguous solutions can be omitted. This is advantageous since less processing will be needed.

The unpermuted beam may be attained by pre-multiplying the desired beamforming vector by the inverse of the identified perturbation matrix, $$w_{unpermuted} = P^T w_{desired} \text{ (if the channel mode is permuted)}$$

or $$w_{unpermuted} = P w_{desired} \text{ (if the channel estimates are permuted)}$$

(If the channel estimates are permuted, this means that the inverse permutation matrix has been found.)

wherein $P^T = P^{-1}$, since P is orthonormal, transforms the desired beamforming vector such that it maps to the correct antenna ports.

As mentioned above the number of connection combinations or permutations is obtained using information provided by the connections combination holder 22A. It should be clear that in this embodiment the channel estimates are permuted. The permutations can be carried out in the processing means, in the model fitting means, in separate means or in the channel estimating means 21A in any appropriate manner. The channel model is then mapped to the permuted channel estimates the number of which in particularly advantageous embodiments equals N!/2, wherein N! is the number of available connection combinations.

In alternative embodiments the connection combination related information provided by the connection combination holder 22A is used to instead permute the channel model comprising a channel model vector. In these cases the permutations (particularly N! or N!/2) are fitted to the channel estimates in the model fitting means to obtain the current connection order which may be held in a current connection holder 27A which is an optional means. In the fitting means 25A all error functions f($\epsilon$) are minimized, the error function e.g. being a WLS or an LS.

Figure 2:
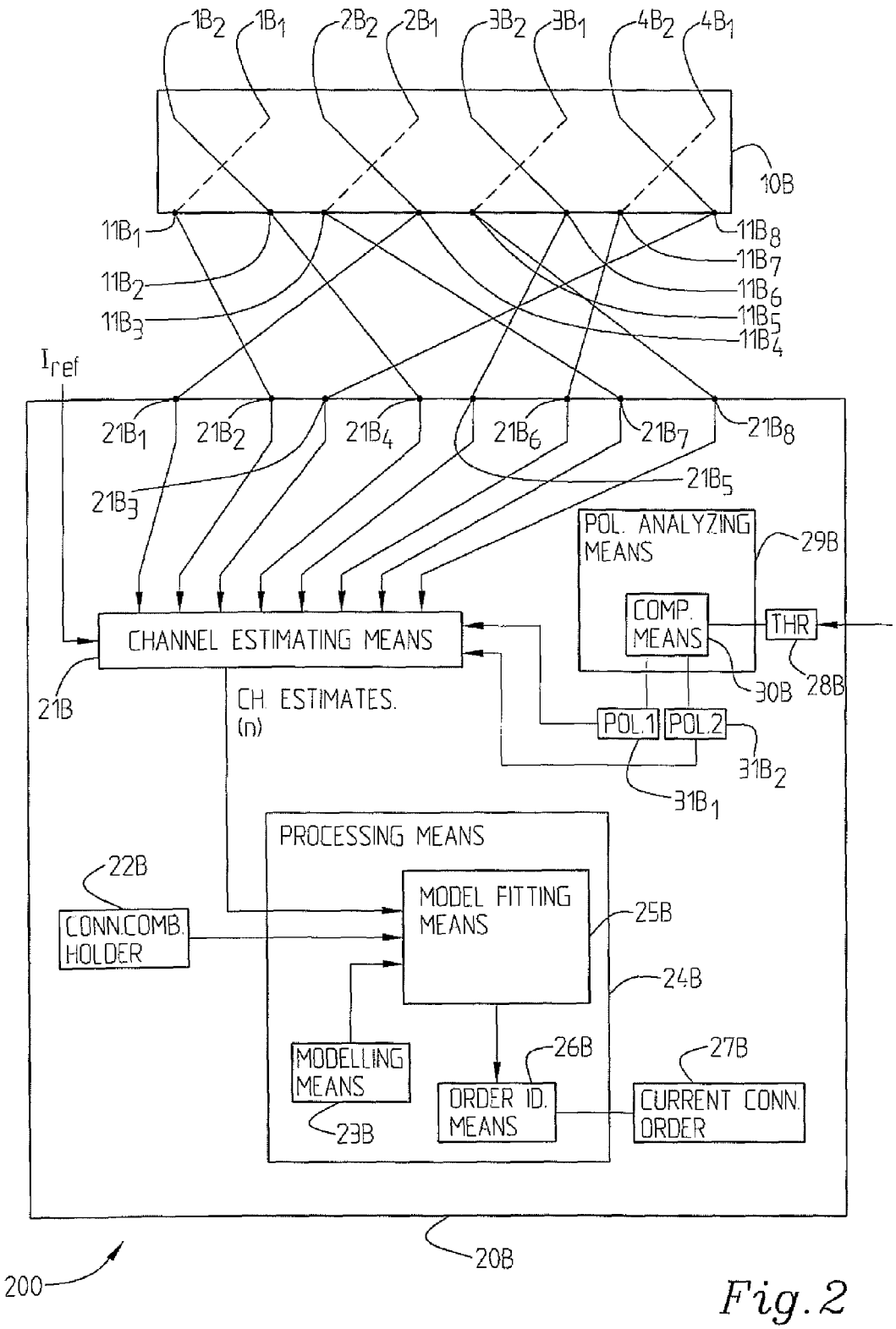
FIG. 2 is a block diagram of a second embodiment of a wireless communication node connected to an antenna arrangement with dual polarized antennas.

FIG. 2 shows an arrangement 200 with a wireless communication node 20B (a base station arrangement) and an antenna which comprises an antenna part 10B with four antenna means each comprising respective first antenna elements $1B_1$, $2B_1$, $3B_1$, $4B_1$ of a first polarization and second antenna elements $1B_2$, $2B_2$, $3B_2$, $4B_2$ of another different polarization. The polarizations may be orthogonal, horizontal, vertical, elliptical or slanted etc. The respective antenna elements are connected to each antenna port $11B_1$, $11B_2$, ..., $11B_8$ identified or ordered in a given manner. Feeder ports $21B_1$, $21B_2$, ..., $21B_8$ are by means of feeder cables connected to the antenna ports $11B_1$, ..., $11B_8$ and the correct connection order should here have been $21B_1$ to $11B_1$, $21B_2$ to $11B_2$ etc. but the actual, current (erroneous) connection order is different and unknown.

In these embodiments there are two different polarizations. Polarization analyzing means 29B are provided in the wireless communication node (base station arrangement) 20B and they are adapted to determine which feeder ports that are connected to the same polarization. The determination is particularly based on the realization that co-polarized antennas have a high correlation wheras cross-polarized antenna elements have a low correlation. Polarization analyzing is more thoroughly described in the co-pending patent application "A WIRELESS COMMUNICATION NODE AND A METHOD RELATED THERETO" filed by the same applicant on the same date as the present application. When a polarization analysis has carried out, the polarizations are handled separately and a number of channel estimates are provided by means of channel estimating means 21B based on one of the approaches described with reference to FIG. 1. Using connection combination information provided by or held in connection combination holding means 22B a channel model is provided by modeling means 23B which are provided in or externally of the processing means. For each polarization, in fitting means 25B, either a normalized channel model vector is fitted to N! or N!/2 permutations of channel estimates. The permutations may be normalized. Alternatively a permuted channel model vector is fitted to normalized channel estimates. This means that either the model vector or the channel estimates may be permuted as discussed above and the fitting carried out in model fitting means 25B may include or not the implementation of a predetermined weighting function or application of different weights to different channel snapshots. Higher weights are e.g. applied to the channel snapshots for which the signal to noise ratio is high, or exceeds a predetermined value. This can be done in many different manners.

The processing means comprises model fitting means 25B adapted to evaluate an error function, which may comprise a WLS calculation or simply a Least Square calculation which does not implement a weighting function or any weighting procedure. In the model fitting means the error functions are minimized for all permutations. In order identifying means 26B, which may be implemented as separate means or as means included in model fitting means 25B, the current order is identified as the permutation for which the fit gives the minimum error. Optionally information about the current connection order may be held in current connection order holding means 27B, which however not are necessary for the functioning of the present invention.

Below is described a way of analyzing the polarization in polarization analyzing means 29B. It is supposed that signals are received by an array of dual polarized antenna means each comprising a first and a second antenna element from a UE (not shown). It is assumed that signals received at different polarizations have a low correlation, whereas signals received at the same polarization have a high correlation. Generally signals received over channels associated with first or second antenna elements have a high correlation whereas signals received over channels associated with a first and a second antenna element respectively have a low correlation. Possible multipaths may have been resolved so that the antenna array of the antenna part 10B receives a planar wavefront from a distinct direction of arrival (DOA) for each multipath component.

The phase progression function over the antenna ports $11B_1$-$11B_8$ is calculated or collected in phase progression function handling means (not shown). It can be described by a function $\psi(k)=2\pi d_k/\lambda \sin \theta$, where $d_k$ is the position of the $k^{th}$ antenna element, $\theta$ is the DOA measured relative to the normal of the array axis and $\lambda$ is the signal wavelength.

In a first step the feeder ports belonging to one and the same polarization have to be grouped together which is achieved by utilizing the fact that signals received over channels associated with antenna elements having different polarizations have a low correlation. Signal analyzing means (not shown) collect uplink signal samples corresponding to one mobile station or user equipment. The signal analyzing means may be in communication with the connection combination providing means 22B for establishing or receiving information about the number of available antenna port combinations, although the provisioning of such information could be implemented and provided for in other manners as well. The correlation matrix information is calculated in the signal analyzing means and comprises the correlation coefficients $$\rho_{ij} = r_{ij}/\sqrt{r_{ii}r_{jj}},$$

$$i = 1, \ldots, K, , j = 1, \ldots, i,$$

wherein $$r_{ij} = \frac{1}{M}\sum_{m=1}^{M} x_i(t_m)x_j^*(t_m)$$

Here K=2N, N being the number of dual polarized antenna elements, and 2N being the total number of antenna/feeder ports, $x_i(t_m)$ is the complex baseband signal, from a single user (user equipment), received from feeder port i at time instant $t_m$. It is here supposed that information about the correlation coefficients is provided to polarization analyzing means 29B even if the steps of signal analyzing, calculation, polarization analyzing can be carried out a common processing arrangement. Subsequently feeder port pairs having a high correlation are to be found. In a first embodiment this is achieved by means of applying a predetermined, e.g. reconfigurable, threshold to the modulus of the correlation coefficient $\rho_{ij}$, $$\bar{\rho}_{ij} \begin{cases} 1 & \text{if } |\rho_{ij}| > \Delta \\ 0 & \text{otherwise} \end{cases}$$

for $1, \ldots, K$ and $j=1, \ldots, i-1$. Generally $0<\Delta<1$ and all pairs of indices $\{i,j\}$ for which $\bar{\rho}_{ij}=1$ are to be identified. If the stated assumptions are valid for the measured signals and the value of $\Delta$ is chosen properly the number of such pairs should be $N(N-1)$, here 12. These pairs are denoted $P_k$, $k=1, \ldots, N(N-1)$.

Alternatively the $N(N-1)$, here 12, largest $|\rho_{ij}|$ are to be found and $k=1, \ldots, N(N-1)$ denotes the index pairs of these correlation coefficients. Since the signals received by antenna elements with different polarizations have low correlation, the indices identified in the previous step will consist of two disjoint subsets; $S_1$ and $S_2$ where $S_1 \cap S_2 = \emptyset$ and $S_1 \cup S_2 = \{1, 2, \ldots, K\}$. Two sets, $I_1$ and $I_2$, of pair numbers are to be found such that:

$$\bigcup_{k \in I_1} P_k = S_1,$$

$$\bigcup_{k \in I_2} P_k = S_2$$

The feeder port numbers in $S_1$ are assigned to polarization 1 and the feeder port numbers in $S_2$ to polarization 2.

Information about which ports belong to which polarization is provided to the channel estimating means 21B, for example by polarization indicating means $31B_1$, $31B_2$. Then the ports belonging to the respective polarizations are handled separately. For a number of permutations as given by the connection combination holding means 22B permutations of a channel model vector provided by modeling means 23B are fitted to a plurality of channel estimates provided for the respective polarization by channel estimating means 21B in model fitting means 25B. Alternatively a normalized channel model vector is fitted to a plurality of permutations of the channel estimates as discussed above. Separately the polarization orders of the respective ports are identified in order identifying means 26B, and the current connection orders may be stored in (optional) holding means 27B. The channel estimating means and/or the modeling means and/or the connection combination holding means can be arranged as separate means or one or more of them may be included in the processing means.

Figure 3:
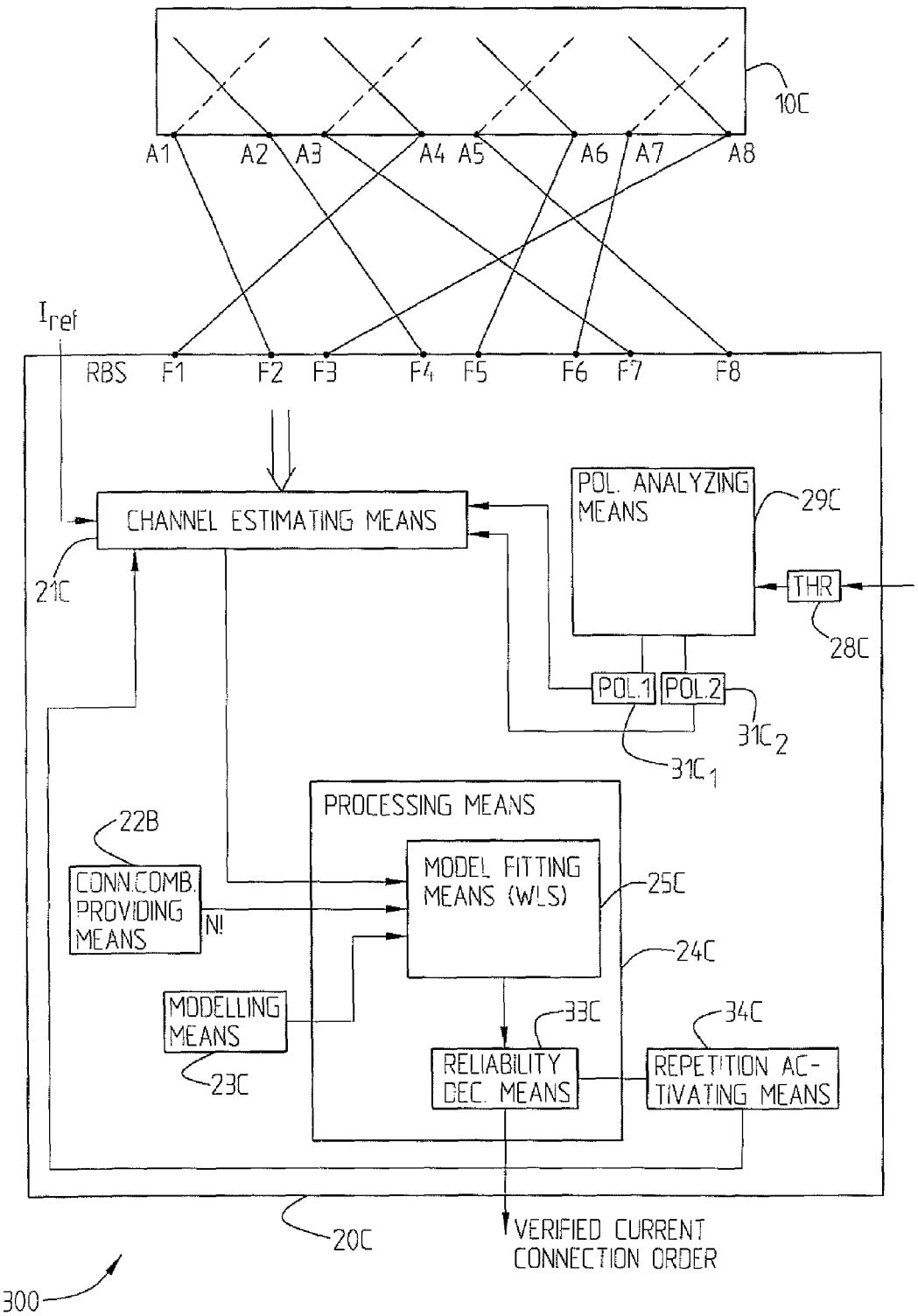
FIG. 3 is a block diagram of a third embodiment a wireless communication node connected to dual polarized antennas and including polarization analyzing means and reliability decision means.

FIG. 3 shows another advantageous implementation of a wireless communication node and antenna arrangement 300 comprising an antenna part 10C with a plurality of antenna means, here each comprising an antenna element of a first polarization and an antenna element of a second polarization as discussed with reference to FIG. 2. The antenna elements are connected to respective antenna ports, A1-A8 to which in turn feeder port F1-F8 have been connected in an unknown order. The wireless communication node (e.g. a base station arrangement) 20C comprises polarization analyzing means 29C to which information about a threshold provided in threshold providing means 28C is input in order to distinguish between ports of polarization 1 and ports of polarization 2 respectively. Information about port polarization is provided by polarization information means $31C_1$ and by polarization information providing means $31C_2$ for separate handling of ports belonging to one or the other polarization. Polarization information providing means $31C_1$, $31C_2$ may of course be in the form of a common means, or information may be provided directly by the polarization analyzing means.

As described earlier connection combination providing means 22C are provided as well as modeling means 23C. Processing means 24C comprises a model fitting means 25C comprising an error function, which in this particular example is supposed to be a Weighted Least Square algorithm. When for the ports of each polarization the current connection order has been found information about which these orders are is input to a reliability decision means 33C. The reliability decision means is used to determine if a found current feeder port connection order is reliable or not. In one embodiment a threshold value $\Delta_{rel}$ is used, which may be predefined and input to the reliability decision means where it is used to determine whether a connection order is reliable or not. If a connection order is considered to be not reliable a decision is provided to repetition activating means 34C to activate collection of new measurement data and/or to use more taps and then the procedure as described above is repeated until the given reliability condition is considered to be met for a found current order. Said reliable current connection order can be stored and/or used in any appropriate manner. It may e.g. be stored in a cache in the wireless communication node (e.g. a base station arrangement).

In one embodiment the reliability decision means are based on SNR values of the channel snapshots and if the values are not satisfactory, for example do not exceed a predetermined threshold value $\Delta_{rel}$, this is considered as the reliability being insufficient and should activate the collection of more measurement data and/or more taps which is easily available. The decision may also be based on the relation between the errors obtained by means of the model fitting means, for example a WLS algorithm, such that if no error is found which is considerably lower than the other errors, this indicates that the obtained current connection order is not sufficiently reliable. Reliability can be determined in different manners.

In some embodiments the polarization analyzing means 29C may be used to actually establish if the antenna part is a single polarized antenna or a dual polarized antenna.

In that case it is first detected if it is a single or a dual polarized antenna through identification of how many pairs there are which have a high correlation. If the number of pairs with a high correlation is high, where the definition of high can be higher than a predetermined value which can be set differently according to different implementations, the conclusion is drawn that it is a single polarized antenna. If the number is low, e.g. lower than a given threshold value it is supposed to be a dual polarized antenna. The relationship between the number of pairs with a high correlation and the number of pairs with a low correlation can alternatively be used to determine whether it is a dual or a single polarized antenna.

If the SNR is high in principle any error function can be used and a conventional Least Square algorithm will give a good realiable result. For cables wherein the SNR is low, for example −5dB, the WLS approach will normally give a better result.

Figure 4:
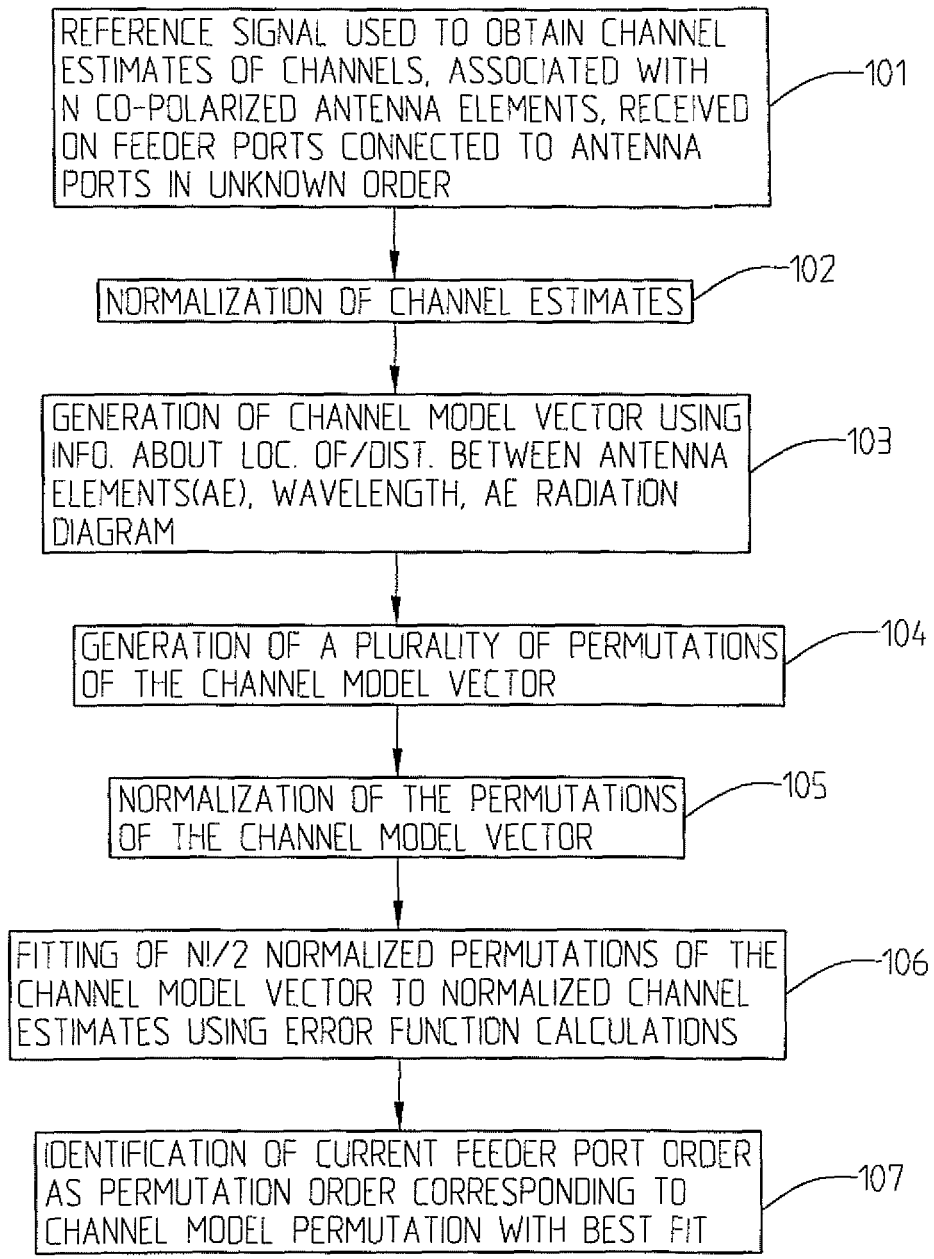
FIG. 4 is a flow diagram describing an embodiment with connection to single polarized antennas or for a single polarization.

FIG. 4 is a flow diagram schematically describing the inventive procedure according to one embodiment. First, a reference signal is used to obtain channel estimates of channels associated with N co-polarized antenna elements received on feeder ports connected to antenna ports in an unknown order, 101. In this embodiment it is supposed that a channel model vector is permuted. Preferably the channel estimates are normalized, 102, as also discussed more in detail earlier. Generation of a channel model vector is performed in channel modeling means using information about location of and/or distance between antenna elements (ae), wavelength and the antenna element radiation diagram, i.e. a model of the signal received by the ULA is modeled depending on the antenna which corresponds to the model that a signal would follow if all ports had been connected in the correct order, 103. Using information about the number of available connection combinations a plurality of permutations of the channel model vector are provided, 104. The permutations of the channel model vector are then normalized, 105. Then preferably N!/2 (or N!, which however requires more calculations, actually only half of them being necessary), normalized permutations of the channel model vector are fitted to normalized channel estimates using error function calculations, 106. Any appropriate error function can be used. Subsequently the current feeder port order is identified as the permutation order corresponding to the channel model permutation which gives the best fit, 107. It should be clear that the procedure described in FIG. 4 only relates to the procedure for co-polarized antenna elements. If the antenna part is dual polarized the steps are carried out separately for each polarization.

Figure 5:
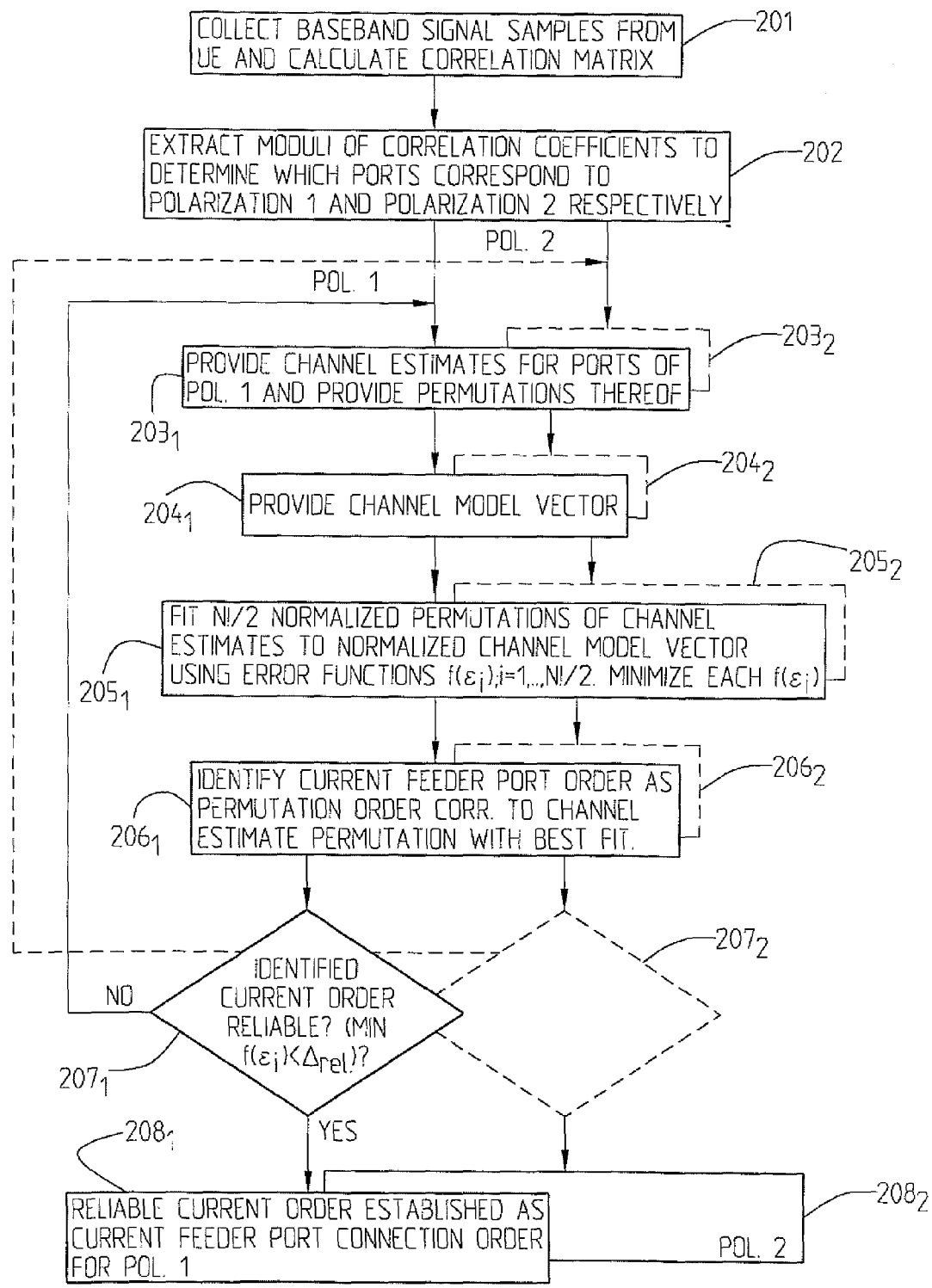
FIG. 5 is a flow diagram of an embodiment for connection to dual polarized antennas.

FIG. 5 shows an example of a procedure when the antenna part comprises antenna elements of different polarizations. The wireless communication node (base station arrangement) comprises means adapted to collect signal samples from a user equipment UE and to, based on this information, calculate a correlation matrix, 201. The moduli of the correlation coefficients are extracted to determine which ports correspond to polarization 1 and to polarization 2 respectively, 202. Then the procedure is performed separately for polarization 1 and polarization 2, steps $203_1$-$208_1$ and $203_2$-$208_2$ respectively. As more thoroughly described above, channel estimates are provided for ports of polarization 1 and in this case permutations of the channel estimates are provided using connection combination information, $203_1$, (correspondingly for polarization 2 $203_2$). Then, a channel model vector is provided, $204_1$, as discussed earlier. The provisioning of a channel model vector can be carried out before, after or simultaneously with steps $203_1/203_2$ above. Subsequently N!/2 normalized permutations of the channel estimates are fitted to the normalized channel model vector using error functions $f(\epsilon_1)$, wherein i=N!/2, including the minimization of each $f(\epsilon_i)$, $205_1$. The current feeder port order is identified as the permutation order corresponding to the channel estimate permutation for which the best fit is obtained, $206_1$. In a subsequent, optional step it is established if the current order obtained through the fitting is reliable, for example by establishing if the minimum $f(\epsilon_i)<\Delta_{rel}$, $207_1$. If not, one returns to step $203_1$ using new input data from the UE until an identified current order is considered to be reliable and which then is established as current feeder port connection order for polarization 1, $208_1$. A corresponding procedure is carried out for feeder ports of polarization 2.

The inventive concept is applicable to any kind of wireless communication node. Even if the wireless communication node mainly has been described as a base station arrangement, it may alternatively comprise a relay node, a repeater, a microwave link or similar.

It should be clear that the invention also in other respects is not limited to the specifically illustrated embodiments but that it can be varied in a number of ways and features and different embodiments can be combined in any appropriate manner and different error functions can be used. It is in any implementation possible to either use permutations of the channel model vector or of the channel estimates.

The invention claimed is:

1. A wireless communication node adapted to be connected to or comprising an antenna part with a plurality of antenna elements and an antenna port for each antenna element, the wireless communication node comprising:
    a plurality of feeder ports adapted to be connected to the antenna ports, each antenna port being associated with a unique antenna port identification, and each feeder port being associated with a unique feeder port identification;
    a signal handling and estimating unit adapted to collect signals from a mobile station and to, for signals received over antenna ports of a first, same, polarization, generate a plurality of channel estimates;
    a connection combination information holding unit adapted to hold information about all possible connections between feeder ports and antenna ports; and
    a processing unit comprising or communicating with:
    a channel modelling unit adapted to provide a channel model for the signals received over the co-polarized antenna elements;
    a channel model fitting unit adapted to compare the channel model with the channel estimates for a plurality of permutations obtained by the connection combination information; and
    an order identifying unit adapted to identify the feeder port connection order corresponding to the permutation order giving the best fit between channel model and channel estimates as the current feeder port connection order.

2. The wireless communication node according to claim 1, wherein
    the channel model comprises a channel model vector.

3. The wireless communication node according to claim 2, wherein the processing unit is adapted to use the connection combination information to generate permutations of the channel model vector to normalize the permutation of the channel model vector and to fit the normalized permutations of the channel model vector to the channel estimates.

4. The wireless communication node according to claim 3, wherein
    the channel estimating unit or the processing unit is adapted to normalize the channel estimates and in that the normalized permutations of the channel model vector are fitted to the normalized channel estimates.

5. The wireless communication node according to claim 1, wherein the processing unit is adapted to use the connection combination information to generate permutations of the channel estimates, to normalize the permutations of the channel estimates and to fit the channel model to the normalized permutations of the channel estimates.

6. The wireless communication node according to claim 5, wherein
    the signal modelling unit or the processing unit is adapted to normalize the channel model vector and to fit the normalized channel model vector to the normalized permutations of the channel estimates.

7. The wireless communication node according to claim 3, wherein
    the processing unit is adapted to identify a permutation order corresponding to the current order in which the feeder ports are connected to the antenna ports arranged in a given, consecutive, order.

8. The wireless communication node according to claim 5, wherein
the processing unit comprises a model fitting unit adapted to evaluate an error function for each permutation and to minimize said error functions over all permutations.

9. The wireless communication node according to claim 8, wherein
the error function comprises a Least Squares calculation.

10. The wireless communication node according to claim 8, wherein
the error function comprises a weighted Least Squares calculation and in that different weights are applied to different channel snapshots and that higher weights are applied to channel snapshots for which the signal to noise ratio is high or exceeds a predetermined value or that it is adapted to implement a predetermined weighting function.

11. The wireless communication node according to claim 1, wherein
the node further comprises a polarization analyzing unit adapted to determine which of the feeder ports are associated with one and the same polarization.

12. The wireless communication node according to claim 11, wherein
the polarization analyzing unit is adapted to analyze moduli of correlation coefficients to distinguish feeder port pairs having a high correlation by comparing each correlation coefficient modulus with a predetermined threshold value, $\Delta_{thr}$, so defined that if $|\rho_{ij}|>\Delta_{thr}$, $\bar{\rho}_{ij}=1$, otherwise $\bar{\rho}_{ij}=0$, for $i=1, \ldots, K$ and $j=1, \ldots, i-1$, and to identify all pairs of indices $\{i, j\}$ for which , $\bar{\rho}_{ij}=1$, comprising pairs of feeder ports having the same polarization, and $\bar{\rho}_{ij}=0$ relating to pairs of feeder ports having different polarizations.

13. The wireless communication node according to claim 1, wherein the node further comprises a reliability decision unit adapted to determine if the identified current feeder port connection order has a reliability which is sufficient according to a given reliability criterion based on the corresponding calculated fit, and if not, to activate collection of or use of additional, new, channel data and/or more taps to obtain further channel estimates and to perform fitting using said new data until reliability is considered to meet the reliability condition.

14. The wireless communication node according to claim 13, wherein
the reliability decision unit comprises a reliability threshold handling unit adapted to hold or receive a resettable reliability threshold value representing the reliability condition to be met.

15. The wireless communication node according to claim 1, wherein
the processing unit is adapted to fit the channel model to the channel estimates for a number of permutations being N!/2, wherein N! corresponds to the total number of permutations, i.e. connection combinations.

16. A method for, in a wireless communication node connected to or comprising an antenna part with a plurality of antenna elements associated with respective antenna ports, determining connection combinations between the antenna ports and feeder ports of the wireless communication node, each antenna port being associated with a unique antenna port identification or order number and each feeder port being associated with a unique feeder port identification, wherein an uplink signal is received over the antenna elements from a mobile station, the method comprising:
performing a channel estimation using a known reference signal to obtain channel estimates;
finding all possible combinations of antenna port and feeder port connections or all possible permutations (N!);
providing or generating, by means of a modeling function, a channel model for a signal received from the mobile station,
for a plurality of permutations:
fitting, for the said plurality of permutations, the channel model to the channel estimates;
identifying the feeder port order corresponding to the permutation giving the best fit between channel model and channel estimate as current feeder port connection order.

17. The method according to claim 16, wherein
the channel model comprises a channel model vector and in that the method comprises the step of, before the fitting step:
generating said plurality of permutations by permuting the channel model vector;
normalizing the permutations of the channel model vector;
and the fitting steps comprises:
using the normalized permutations of the channel model.

18. The method according to claim 17, wherein the fitting step comprises using normalized channel estimates.

19. The method according to claim 16, further comprising
performing or generating permutations of the channel estimates;
normalizing the permutations of the channel estimates;
and the fitting step comprises:
fitting the channel model vector to the normalized permutations of the channel estimates.

20. The method according to claim 19, wherein the method further comprises normalizing the channel model vector before the fitting step; and
the fitting step comprises fitting the normalized channel model vector to the normalized permutations of the channel estimates.

21. The method according to claim 16,
wherein the fitting step comprises:
applying an error function to each of a number of channel snapshots, and
minimizing the error function for each permutation to find the permutation for which the best fit is obtained.

22. The method according to claim 21, wherein
the step of applying the error function comprises using a weighted Least Square algorithm, and
applying different weighting factors to different channel snapshots by applying larger weights to channel snapshots having a high signal-to-noise ratio and smaller weights to channels having a low signal-to-noise ratio or by applying a predetermined weighting function.

23. The method according to claim 16, further comprising:
determining, in a polarization analyzing step, which feeder ports are associated to one and the same polarization; and
determining current feeder port order separately for each polarization.

24. The method according to claim 16, further comprising:
determining if an identified current feeder port connection order has a reliability which is sufficient according to a predetermined criterion; if not, collecting new additional channel data, to obtain further channel estimates, and repeating the fitting step based on said further channel estimates until the reliability is determined to meet the predetermined criterion.

* * * * *

UNITED STATES PATENT AND TRADEMARK OFFICE
CERTIFICATE OF CORRECTION

PATENT NO. : 8,526,553 B2
APPLICATION NO. : 13/376420
DATED : September 3, 2013
INVENTOR(S) : Coldrey et al.

It is certified that error appears in the above-identified patent and that said Letters Patent is hereby corrected as shown below:

In the Specification

In Column 1, Line 27, delete "arrangments" and insert -- arrangements --, therefor.

In Column 3, Line 64, delete "examplary" and insert -- exemplary --, therefor.

In Column 4, Line 5, delete "practise" and insert -- practice --, therefor.

In Column 6, Line 7, delete "predermined" and insert -- predetermined --, therefor.

In Column 6, Line 17, delete "improvied" and insert -- improved --, therefor.

In Column 6, Line 41, delete "sence" and insert -- sense --, therefor.

In Column 6, Line 56, delete "mode" and insert -- model --, therefor.

In Column 7, Line 44, delete "wheras" and insert -- whereas --, therefor.

In Column 8, Line 28, delete "multipaths" and insert -- multipath --, therefor.

Signed and Sealed this
Twenty-second Day of July, 2014

Michelle K. Lee
*Deputy Director of the United States Patent and Trademark Office*